S. H. HEIST.
METHOD OF MAKING BATTERY JARS.
APPLICATION FILED SEPT. 9, 1921.
1,414,326.
Patented Apr. 25, 1922.
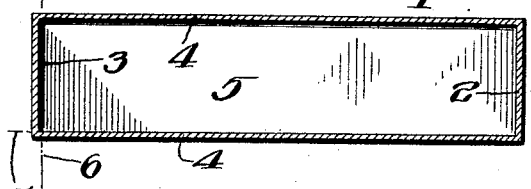
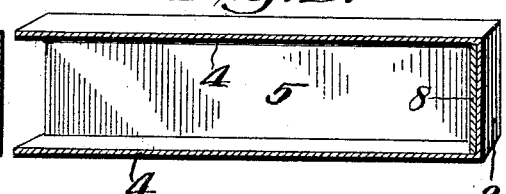
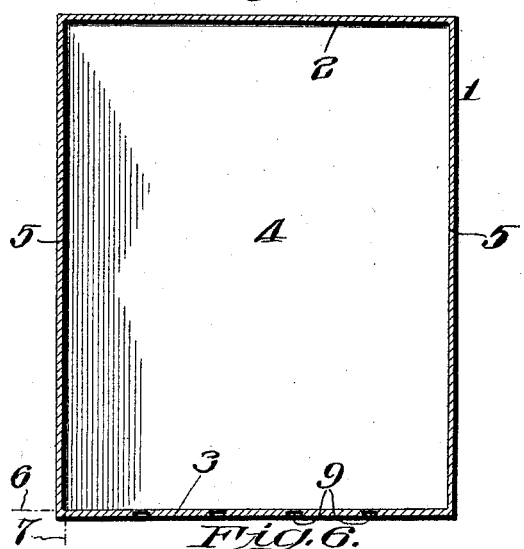
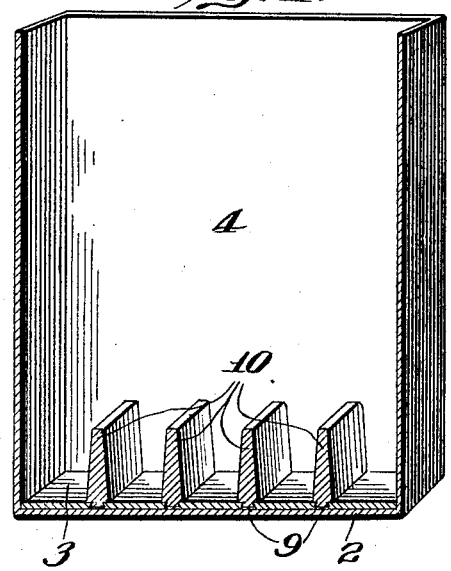
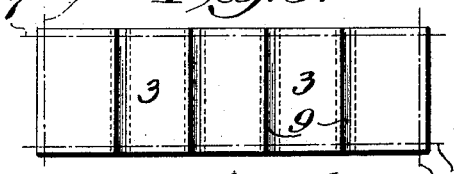
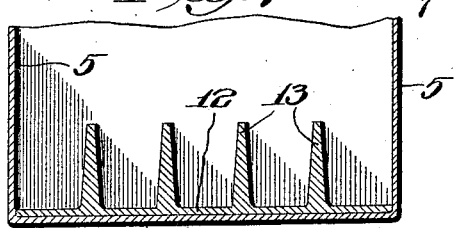
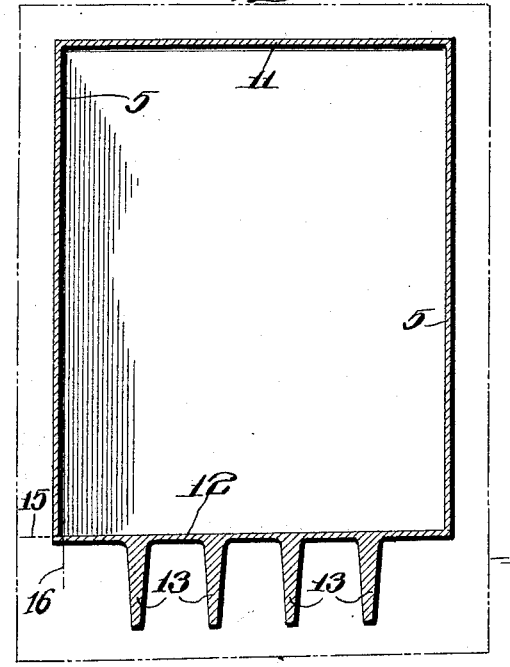
INVENTOR
Stuart H. Heist.
BY
ATTORNEYS

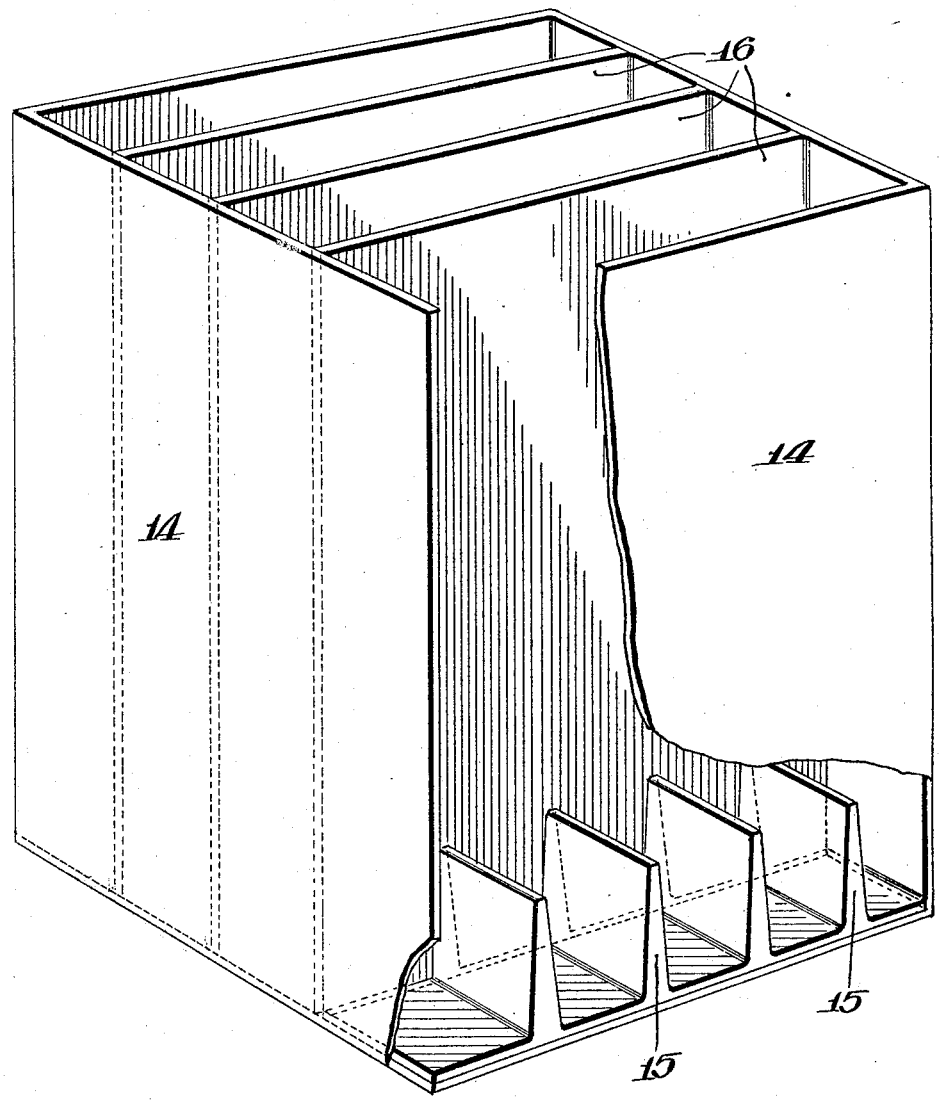

UNITED STATES PATENT OFFICE.

STUART H. HEIST, OF PENLLYN, PENNSYLVANIA, ASSIGNOR TO PENN RUBBER PRODUCTS CORPORATION, OF PHILADELPHIA, PENNSYLVANIA, A CORPORATION OF DELAWARE.

METHOD OF MAKING BATTERY JARS.

1,414,326.   Specification of Letters Patent.   Patented Apr. 25, 1922.

Application filed September 9, 1921. Serial No. 499,479.

*To all whom it may concern:*

Be it known that I, STUART H. HEIST, a citizen of the United States, residing in Penllyn, county of Montgomery, State of Pennsylvania, have invented a new and useful Method of Making Battery Jars, of which the following is a specification.

My present invention comprehends a novel method of making containers with an open end, such as for example, battery jars, wherein the jar is initially formed with its end closed, and thereafter one end is cut off and secured in the bottom of the open ended jar thus formed in order to reinforce the bottom and if desired form spacing members.

The end which is removed or severed may be formed with slots or key ways in it, adapted to receive spacing members, or the end which is cut off may have formed integral with it the spacing members hereinafter referred to.

It further comprehends a novel method of making battery jars, wherein the battery jar is first formed in the shape of a closed biscuit, which is thereafter vulcanized in a mold to form a closed container, one end of said container being next cut off and secured in the bottom of the open ended container or jar to provide spacing members.

Other novel steps and features of my invention will hereinafter more fully appear in the detailed description of the invention.

For the purpose of illustrating one manner in which my method can be carried out in practice, I have shown in the accompanying drawings different embodiments thereof and it is to be understood that the various instrumentalities employed in the carrying out of the steps of my invention may vary widely in practice, as well as the order in which the steps are carried out.

Figure 1 represents a transverse section of a biscuit after vulcanization.

Figure 2 represents a transverse section of the vulcanized jar after the removal of one of its closed ends, and the insertion of such end into the jar the latter being shown as lying on its side.

Figure 3 represents a vertical section of another embodiment of my invention, showing the construction as it appears prior to the removal of one of its ends, the jar body being shown as standing upright.

Figure 4 represents a vertical section of the completed battery jar formed as seen in Figure 3 one end having been cut off and provided with spacing members and secured in the bottom of the jar.

Figure 5 represents a bottom plan view of the bottom end seen in Figure 3 which is cut off.

Figure 6 represents a vertical section of another embodiment of my invention.

Figure 7 represents a fragmentary vertical section of the battery jar completed from the construction seen in Figure 6.

Figure 8 represents a perspective view of another embodiment of my invention.

Similar numerals of reference indicate corresponding parts.

Referring to the drawings,

In carrying out my invention the article is first formed in the shape of a biscuit preferably by pneumatically seating the plastic stock in sheet form in mold cavities and then bringing the juxtaposed edges of article sections together to seam them, an expansible medium being first placed in one of the sections prior to the seaming operation.

The formed biscuit is then placed in a vulcanizing mold and vulcanized in its final form, each end of the article being closed. One end of the article is then cut or severed in such a manner as to separate it from the body portion of the battery jar and cut to give to it the proper dimensions so that it will fit in the bottom of the battery jar. The end which is cut off may be provided with slots with which independent spacing members are assembled or interlocked prior to the insertion of such end into the bottom of the jar, or the spacing members may be formed integral with the cut off end.

In Figure 1, I have shown a transverse section of a battery jar body, which is closed on all sides and formed in accordance with the first steps of my invention and in Figure 2, I have shown a similar transverse section with the top removed and serving as a reinforcement for the bottom of the jar.

1 designates the article at one stage of the operation, for example, as it appears after it has been vulcanized, it being apparent from Figure 1 that the container is rectangular in shape having the closed bottom 2, closed top 3, closed sides 4 and the closed sides 5. The top 3 is now cut off by sewing on the line 6 and the top 3 is then sawed or trimmed on the lines 7, so that it will fit against the bottom of the box when inserted thereinto in the form of a strip 8 through its open end, as will be understood from Figure 2, where the jar is shown as lying on its side. The strip 8 may having a driving fit in the box or it may be cemented, vulcanized or otherwise secured to the bottom of the box to form a reinforcement therefor and also to carry the spacing members of any desired character. If desired the reinforcing strip 8 may be omitted and the spacing members simply placed in the bottom of the open ended box.

In the embodiment seen in Figures 3 and 4, 2 designates the bottom and 3 the top to be severed and the method of manufacture is the same, except that the closed top 3 is provided with the parallel slots or dovetail grooves 9, the side walls of which may be straight or inclined in order to receive the tongues of the spacing members 10, which are inserted into said grooves after said closed top 3 has been cut on the lines 6 and trimmed on the lines 7. The member 3 after being trimmed on the dotted lines seen in Figure 5 may have a driving fit in the bottom of the jar or it may be cemented, vulcanized or otherwise secured thereto.

In the embodiment seen in Figures 6 and 7, the battery jar is initially formed with the closed bottom 11 and the closed top 12 which latter has projecting outwardly therefrom the parallel ribs or spacing members 13. The biscuit is then vulcanized in a vulcanizing mold shown in dotted lines in Figure 6 and indicated by reference character 14. The top member 12 is then cut and trimmed on the lines 15 and 16 and inserted in the bottom of the box, as shown in Figure 7, and secured thereto in any desired manner, for example, by a driving fit or by cementing or by vulcanizing.

In the initial forming of the biscuit prior to vulcanization, I preferably employ one of the methods disclosed in my co-pending application Serial #486,998.

While I have referred specifically to the making of a battery jar, it will be apparent that in the broad and generic scope of my invention, the ultimate open ended container is primarily made in the form of a closed container or closed rectangular body after which one end is removed to form an open ended container, and if desired cut or trimmed in such a manner, that it can be inserted into position against the bottom of the container to act as a reinforcement for such bottom, while if desired spacing members may be placed in the container or secured to the bottom thereof or to the reinforcement formed by the severed and trimmed end which has been removed from the closed container.

It will be apparent from the foregoing that in the manufacture of my invention there is no waste, as the severed member may be utilized as above described, and operations of severing and trimming the severed member can be expeditiously and cheaply performed.

It is to be understood that I contemplate in my present invention making an open ended container which is first made in a closed form and then one end or wall thereof removed to form a container which is open at one end and this container is adapted for many uses. For example, it may be used as a battery jar or it may form the box which is to contain the different cells of the battery in which case separate battery jars constructed as herein set forth may be employed or the jar, per se, may be dispensed with and the open ended container will have the spacing devices forming spacers or partitions to separate the different cell units of the battery. I have shown the spacing members in Figure 4 as extending above the bottom of the container and it will be apparent that these can be extended to any desired distance above said bottom and that one or more may be employed in accordance with conditions and requirements met with in practice and some may extend higher than others.

In the embodiment seen in Figure 8, I have shown the container in the form of a battery box having partitions forming fluid tight compartments to receive the unit cells of the battery which in such case do not have to be contained within their own independent jar unless desired. Each compartment is provided with spacing devices in its bottom in order to form pockets. In this embodiment 14 designates the container which is formed from the plastic stock as a closed biscuit with an expansible medium entrapped therein. The biscuit is then vulcanized and one end removed. Either the partition plates or pocket forming spacing members can be molded in position during the vulcanization of the closed container or either or both may be secured within the container after it has been vulcanized and the end removed. The bottom spacing devices may be made integral with an end of the container in a similar manner to that shown in Figure 6 or they may be otherwise formed and inserted after the end of the closed container has been removed. I have designated the bottom spacing members as 15 and the compartment forming partitions as 16. These partitions 16 may have a driving fit or be cemented or vulcanized in place and this also holds true of the bottom spacing devices 15.

It will now be apparent that I have devised a novel and useful method of making battery jars which embodies the features of advantage enumerated as desirable in the statement of the invention and the above description, and while I have, in the present instance, shown and described embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:

1. The herein described method of forming a container which consists in initially forming a biscuit of plastic material with an expansible medium entrapped therein, then vulcanizing said biscuit to form a completely closed container, next severing an end from said container, and lastly securing spacing devices in the bottom of the latter.

2. The herein described method of making a battery jar, which consists in first forming a biscuit from plastic material with an expansible medium entrapped therein, then vulcanizing said biscuit to form a completely closed rectangular container, next severing an end from said container, and lastly, positioning said severed end within the bottom of said container.

3. The herein described method of making battery jars, which consists in first forming a biscuit from plastic material with an expansible medium entrapped therein, next vulcanizing said biscuit to form a completely closed container, next severing an end from said container, next conforming the edges of said severed end to substantially the internal dimensions of said container, and lastly, positioning said severed end in the bottom of said container.

4. The herein described method of forming a container, which consists in first forming a biscuit of plastic material with an expansible medium entrapped therein, next vulcanizing said biscuit to form a completely closed container, next, severing an end from said container, securing spacing devices to said end, and next securing said severed end and the spacing devices thereon against the bottom of said container.

5. The herein described method of forming a container, which consists in first forming a biscuit of plastic material with an expansible medium entrapped therein, next vulcanizing said biscuit to form a completely closed container, next severing an end from said container, next securing parallel spacing members to said severed end, and lastly securing said severed end and spacing members to the bottom of said container.

6. The herein described method of making a container, which consists in forming a body closed on all sides, severing one end of said body, trimming the edges of said severed end substantially to conform to the internal dimensions of said container, and lastly positioning said severed end in the bottom of said container.

7. The herein described method of making a battery jar, which consists in first forming a closed rectangular body with spacing devices extending from an end thereof, next severing one end of said body therefrom, and next securing said severed end with its spacing devices against the bottom of said jar.

8. The herein described method of making a battery jar, which consists in first forming a closed body, with an end having parallel grooves therein, severing said end from said body, securing spacing members in said grooves, and lastly securing said severed end and spacing members in the bottom of said jar.

9. The method of forming a container, which consists in initially forming a vulcanized container closed on all sides, severing one side of said container, and securing spacing devices within said container at angles to each other to form bottom spacing devices and fluid tight compartments.

STUART H. HEIST.

Witnesses:
H. S. FAIRBANKS,
C. D. McVAY.